United States Patent
Crawford

(10) Patent No.: US 10,437,588 B1
(45) Date of Patent: Oct. 8, 2019

(54) SMART SYSTEM FOR AUTO-SIGNING, MANAGING AND, MAKING RECOMMENDATIONS FOR SOURCE CODE COMMENTS

(71) Applicant: SAP SE, Walldorf (DE)

(72) Inventor: James Crawford, Dublin (IE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/977,523

(22) Filed: May 11, 2018

(51) Int. Cl.
G06F 8/73 (2018.01)
G06F 17/27 (2006.01)
H04L 9/32 (2006.01)
G06F 8/33 (2018.01)

(52) U.S. Cl.
CPC ............ *G06F 8/73* (2013.01); *G06F 8/33* (2013.01); *G06F 17/2785* (2013.01); *H04L 9/3247* (2013.01)

(58) Field of Classification Search
CPC .......... G06F 8/73; G06F 8/33; G06F 17/2785; H04L 9/3247
See application file for complete search history.

(56) References Cited

U.S. PATENT DOCUMENTS

| | | | |
|---|---|---|---|
| 7,565,544 B1 * | 7/2009 | Eatough | G06F 21/51 713/161 |
| 7,966,260 B2 | 6/2011 | Gernold | |
| 8,010,484 B2 | 8/2011 | Gernold | |
| 8,091,043 B2 | 1/2012 | Schubert et al. | |
| 8,316,380 B2 | 11/2012 | Keil et al. | |
| 8,745,635 B2 | 6/2014 | Balko et al. | |
| 8,904,343 B2 | 12/2014 | Balko et al. | |
| 8,972,868 B2 | 3/2015 | Schubert | |
| 9,721,230 B2 | 8/2017 | Trump et al. | |
| 2007/0276715 A1 | 11/2007 | Beringer | |
| 2008/0115195 A1 | 5/2008 | Malek | |
| 2009/0064130 A1 | 3/2009 | Davis | |
| 2012/0060082 A1 * | 3/2012 | Edala | G06F 17/241 715/231 |
| 2012/0271854 A1 | 10/2012 | Truong et al. | |
| 2014/0013315 A1 | 1/2014 | Genevski | |
| 2017/0371629 A1 * | 12/2017 | Chacko | G06F 8/36 |

FOREIGN PATENT DOCUMENTS

WO WO-2016063147 A1 * 4/2016 ............ G06F 17/211

* cited by examiner

*Primary Examiner* — Wei Y Zhen
*Assistant Examiner* — Amir Soltanzadeh
(74) *Attorney, Agent, or Firm* — Fish & Richardson P.C.

(57) ABSTRACT

Methods, systems, and computer-readable storage media for receiving a request to open a source code file for editing within an integrated development environment (IDE), determining that the source code file includes source code with first comment text having a first digital signature associated therewith, authenticating the first digital signature, and in response, providing the source code file for display in the IDE, receiving input data, determining that the input data includes authoring of comment text within the source code file, and in response, automatically: providing comment metadata that is associated with the comment text and providing a second digital signature that is associated with the comment text, and storing the comment text, the comment metadata, and the second digital signature in a comment metadata repository.

20 Claims, 4 Drawing Sheets

SMART SYSTEM FOR AUTO-SIGNING, MANAGING AND, MAKING RECOMMENDATIONS FOR SOURCE CODE COMMENTS

BACKGROUND

Computer-executable applications originate in source code provided by one or more developers. For example, developers author source code using human-readable programming languages (e.g., Java, C, Ruby, Python). In some examples, the source code is compiled into binary code, which is machine-readable, and enables a computing device to execute the application. Source code of an application can be authored by multiple developers, and can evolve over time. For example, original source code can be authored by an initial group of developers, and subsequent iterations of the source code can be revised, and authored by a different group of developers.

Source code often includes inert comments inserted by developers, which provide insight into the source code. For example, a portion of source code may have been modified to improve the efficiency of application, and the developer that made the modification can insert a comment to explain the modification, and/or the reasoning behind the modification. However, comments can be diluted over time, and/or the source of the comments (e.g., the developer who inserted the comment) can become obfuscated.

SUMMARY

Implementations of the present disclosure are generally directed to development of source code. More particularly, implementations of the present disclosure are directed to computer-implemented a smart system for auto-signing, managing, and making recommendations based on source code comments. In some implementations, actions include receiving a request to open a source code file for editing within an integrated development environment (IDE), determining that the source code file includes source code with first comment text having a first digital signature associated therewith, authenticating the first digital signature, and in response, providing the source code file for display in the IDE, receiving input data, determining that the input data includes authoring of comment text within the source code file, and in response, automatically: providing comment metadata that is associated with the comment text and providing a second digital signature that is associated with the comment text, and storing the comment text, the comment metadata, and the second digital signature in a comment metadata repository. Other implementations of this aspect include corresponding systems, apparatus, and computer programs, configured to perform the actions of the methods, encoded on computer storage devices.

These and other implementations can each optionally include one or more of the following features: the comment text of the input data includes a modification of the first comment text, the first comment text having been authored by a first user, the modification having been authored by a second user, and the second digital signature is unique to the second user and the modification; the comment text of the input data includes a second comment added to the source code by a user, and the second digital signature is unique to the user and the second comment; actions further include providing one or more recommendations for the comment text based on the input data; a recommendation includes optional comment text; a recommendation includes a snippet of source code; and the one or more recommendations are provided based on semantic analyses of a plurality of comments included across a plurality of source code files.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to development of source code. More particularly, implementations of the present disclosure are directed to computer-implemented a smart system for auto-signing, managing, and making recommendations based on source code comments. Implementations can include actions of receiving a request to open a source code file for editing within an integrated development environment (IDE), determining that the source code file includes source code with first comment text having a first digital signature associated therewith, authenticating the first digital signature, and in response, providing the source code file for display in the IDE, receiving input data, determining that the input data includes authoring of comment text within the source code file, and in response, automatically: providing comment metadata that is associated with the comment text and providing a second digital signature that is associated with the comment text, and storing the comment text, the comment metadata, and the second digital signature in a comment metadata repository.

Figure 1:
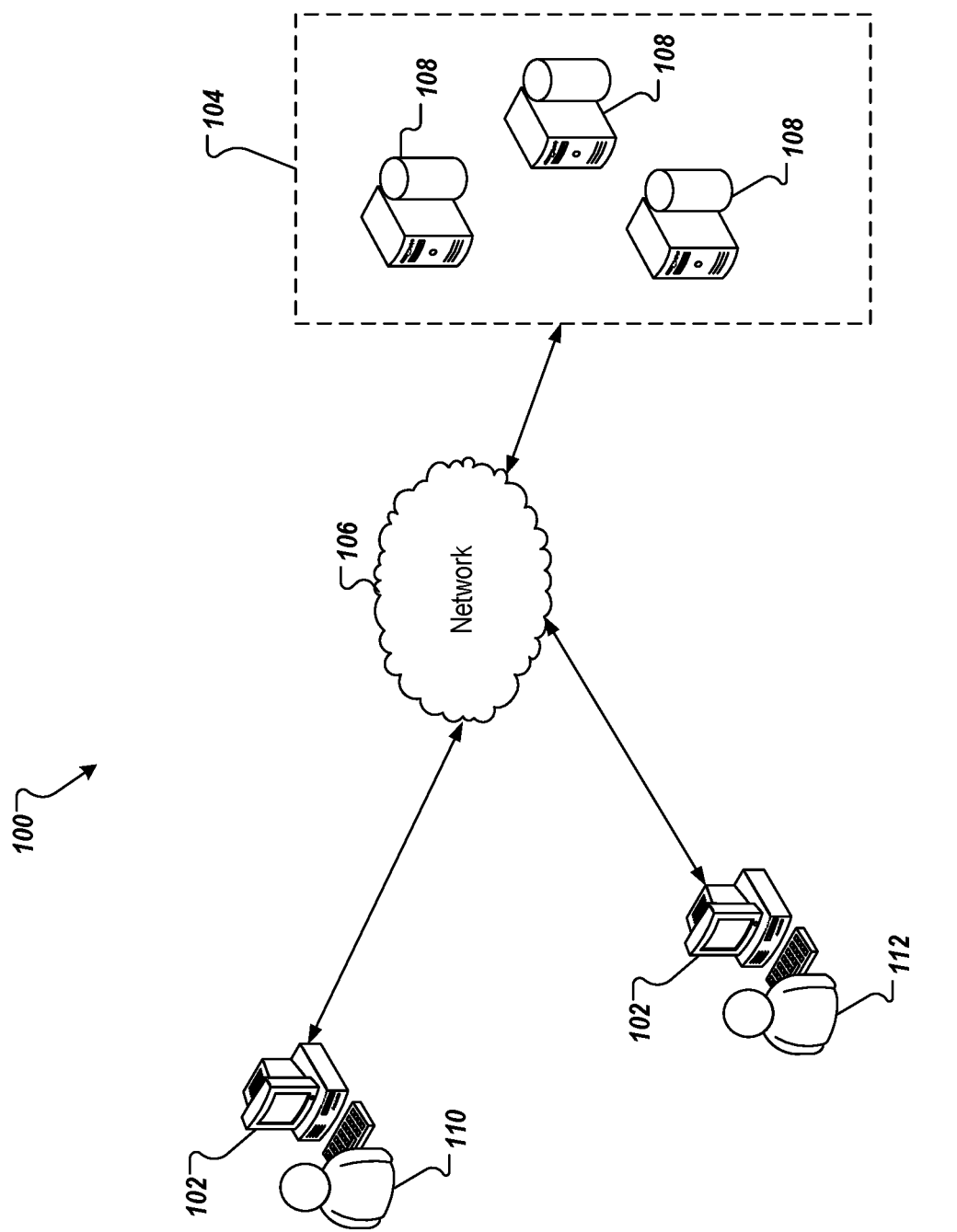
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, users 110, 112 interact with the client devices 102. In an example context, the users 110, 112 can include developers, who author, and/or modify source code through a development environment that is at least partially hosted by the server system 104.

In some examples, the client devices 102 can communicate with one or more of the server devices 108 over the network 106. In some examples, the client devices 102 can include any appropriate type of computing device such as a desktop computer, a laptop computer, a handheld computer, a tablet computer, a personal digital assistant (PDA), a cellular telephone, a network appliance, a camera, a smart phone, a media player, a navigation device, an email device, a game console, or an appropriate combination of any two or more of these devices, or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In some implementations, the server system 104 can at least partially host an integrated development environment (IDE) (e.g., provided as one or more computer-executable programs executed by one or more computing devices) that enable the users 110, 112 to develop source code. In some examples, the IDE can be a web-based IDE. An example web-based IDE includes SAP Web IDE provided by SAP SE of Walldorf, Germany. In some examples, the IDE can be a desktop-based IDE. An example desktop-based IDE includes the Eclipse IDE provided by the Eclipse Foundation, Inc. In some examples, one or more user interfaces (UIs) of the IDE can be displayed on the client device 102, through which the users 110, 112 can create, and access source code stored in the server system 104.

In accordance with implementations of the present disclosure, the server system 104 can at least partially host a comment metadata (MD) platform. In some implementations, and as described in further detail herein, the comment MD platform provides a smart system for auto-signing, managing, and making recommendations based on source code comments. In some examples, the comment MD platform is included as part of the IDE. In some examples, the commend MD platform is separate from, but interacts with the IDE.

To provide context for implementations of the present disclosure, and as introduced above, source code of an application can be authored by multiple developers, and can evolve over time. For example, original source code can be authored by an initial group of developers (e.g., the user 110 of FIG. 1), and subsequent iterations of the source code can be revised and authored by a different group of developers (e.g., the user 112 of FIG. 1). This can occur minutes, hours, days, weeks, months, years, even decades after the original source code was authored. Source code often includes inert comments inserted by developers, which provide insight into the source code. For example, a portion of source code may have been modified to improve the efficiency of application, and the developer that made the modification can insert a comment to explain the modification, and/or the reasoning behind the modification. However, comments can be diluted over time, and/or the source of the comments (e.g., the developer who inserted the comment) can become obfuscated.

Accordingly, one of the challenges developers face is working with source code that other developers have authored/modified. Even with best intentions and adherence to processes (e.g., documenting source code, commenting check-ins to source control systems (SCS), adding comments to the source code), it is nearly impossible (or, at best, extremely challenging and time consuming) to identify sources of comments. That is, to determine which developer(s) authored the comment, and/or understand what the comment means in the context of the source code. Consequently, it is difficult and time consuming for developers to identify a contact person with whom to seek clarification on previously authored comments.

This difficulty is compounded by the fact that subsequent developers may modify other developer's comments (potentially changing their meaning), and/or more seriously modify the source code and not update the relevant comments to keep pace with code changes. This can result in the comments being rendered misleading, or even useless. Consequently, developers may have little to no faith in comments, and ignore them. This can be detrimental to execution of the resulting application. For example, a comment may provide insight into why a portion of the source code was modified (e.g., fix a bug, improve execution efficiency in terms of technical resources (processors, memory). If the comment is ignored, or misunderstood, the current developer may modify the source code in a way that reintroduces the original problem (e.g., bug reappears, execution efficiency degrades).

In some examples, if a developer seeks to identify the author of a comment within the source code, the developer may need to reverse engineer SCS check-ins, and iterate over every check-in to identify the developer that checked in the version of the source code, in which the comment first appeared (e.g., identify the developer that checked-in the changes including the comment). Depending on the age, complexity, and number of developers touching the source code, there can be several tens, hundreds, even thousands of check-ins to iterate over in applying this reverse engineering/brute force approach.

In view of the foregoing, implementations of the present disclosure provide the comment MD platform that ensures comments, and any modifications to comments are traceable back to the original authors. That is, for example, the comment MD platform of the present disclosure enables traceability to efficiently identify an original author (developer) of a comment within source code, and any modifying-authors (developers), who modified the original comment.

As described in further detail herein, the comment MD platform of the present disclosure provide a number of advantages above, and beyond identifying sources of comments. For example, the traceability of the comment MD platform can be used to identify software implementation patterns/approaches within enterprise, providing a grass roots view of how developers solve problems, and/or work around issues. As another example, the comment MD platform enables standardization of comments through semantic (text) analysis, and providing real-time (or near real-time) comment recommendations to developers. As another example, the comment MD platform provides visibility and accountability around comments, which encourages developers to produce higher quality comments, and update/enhance any existing comments in modules they may be required to edit. In other words, the comment MD platform provides an upward spiral in terms of source code quality, and overall visibility. Further, development teams may not communicate with other teams in different reporting lines, yet these developers face similar problems and may have solutions that will benefit others. The comment MD platform of the present disclosure provides the ability to introspect comments, identify common themes, and query external sources (e.g., crawl the web). By analyzing the existing code base for possible solutions, development productivity is enhanced, and leads to organization-wide consistency (both within and across projects). This supports a more agile development environment by easing the reallocation of resources to different teams.

Figure 2:
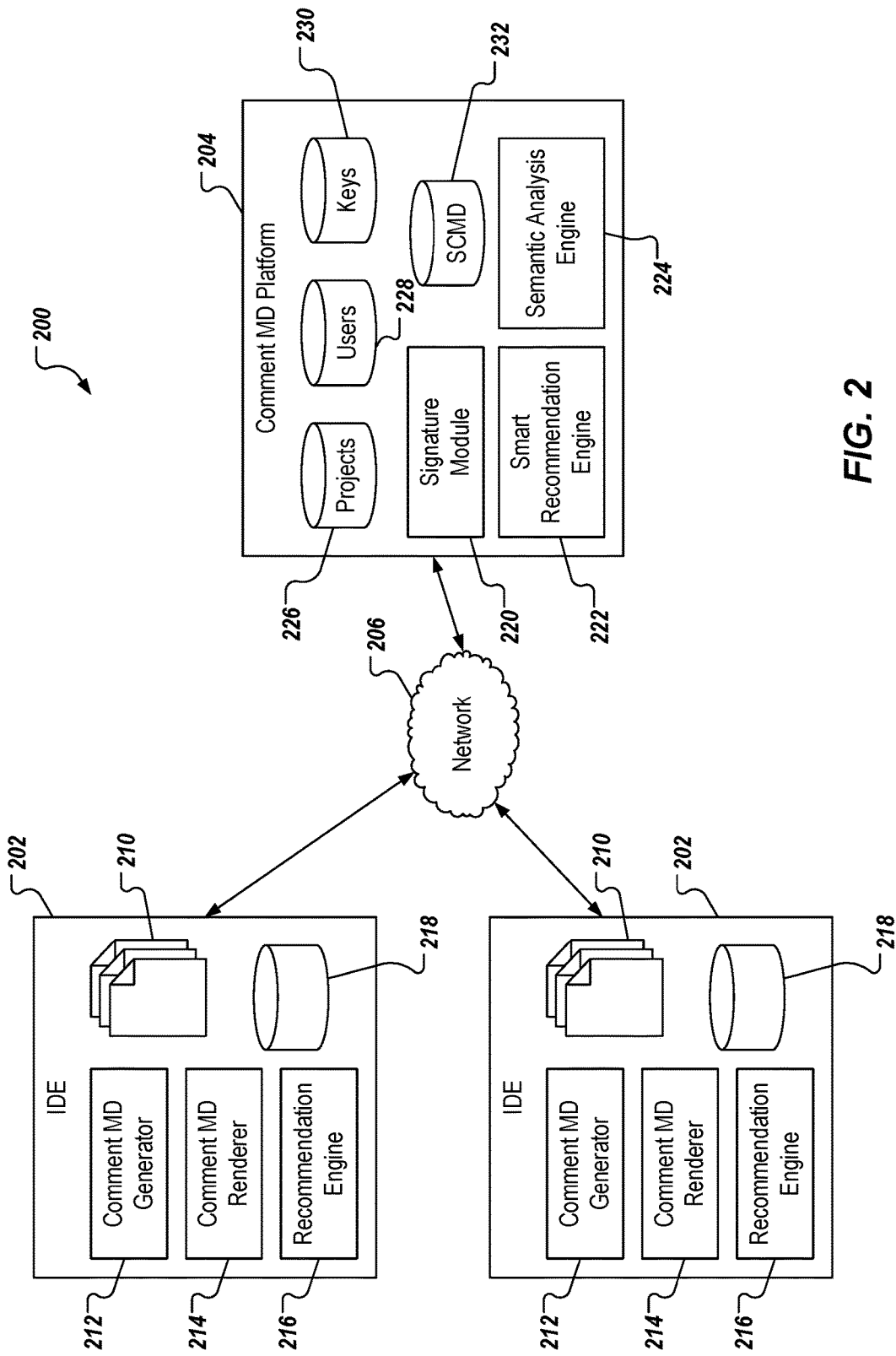
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an IDE 202 and a comment MD platform 204 that communicate over a network 206. In some implementations, the IDE 202 is part of an IDE system (e.g., the IDE 202 represents a front-end of the IDE system, through which users interact with the IDE system).

In the example of FIG. 2, multiple IDEs 202 are depicted. In some examples, each IDE 202 corresponds to a user session, which includes a user that is logged into the IDE 202 to develop source code. For example, the user 110 of FIG. 1 can be logged into an IDE 202 through the respective client device 102, and the user 112 can be logged into an IDE 202 through the respective client device 102. In some examples, the users 110, 112 can be agents (e.g., employees) of the same enterprise (e.g., company). For example, the IDE 202 is enterprise-specific. In some examples, the users 110, 112 can be agents (e.g., employees) of different enterprise (e.g., companies). For example, the IDE 202 is not specific to a particular enterprise, and can be individually accessed by multiple enterprises. Implementations of the present disclosure are described in further detail herein with reference to a single IDE 202 of FIG. 2.

In some implementations, the comment MD platform 204 is hosted on one or more server systems (e.g., the server system 104 of FIG. 1). In some examples, the comment MD platform 204 is hosted at an enterprise-level (e.g., within a server system that is operated by, or on behalf of a specific enterprise). In some examples, the comment MD platform 204 is hosted at a global-level (e.g., within a server system that is accessible to multiple enterprises). In some implementations, the comment MD platform 204 is part of an IDE system (e.g., that includes the IDE 202, and the comment MD platform 204). In some implementations, the comment MD platform 204 is provided as a separate service that interacts with, and is accessible to an IDE system.

In the depicted example, the IDE 202 includes source code 210 (e.g., one or more computer-readable files that contain compile-able, human-readable, source code), a comment MD generator 212, a comment MD renderer 214, a recommendation engine 216, and a comment MD repository 218. The comment MD platform 204 includes a signature checker 220, a smart recommendation engine 222, a semantic analysis engine 224, a project repository 226, a user repository 228, a key repository 230, and a signed comment MD repository 232.

In some implementations, the IDE 202 enables the comment MD components to access one or more (code development) editors of the IDE 202, and vice-versa. In some examples, the IDE 202 enables one or more of the comment MD generator 212, the comment MD renderer 214, the recommendation engine 216, and the comment MD repository 218, and vice-versa. For example, the IDE 202 enables access to editors, such that key strokes (e.g., representative of comment inputs) can be interpreted, and/or analyse source code files (e.g., periodically, on save), and generate the comment MD. In some examples, and as described in further detail herein, the IDE 202 enables users (developers) to view comment MD associated with the source code 210 (e.g., hover over comments and see who signed last, or introspect and display the history).

In some implementations, and as described in further detail herein, comments to source code 210 are signed based on a unique signature of the developer authoring the comment. In some examples, authoring can include creating, modifying, and deleting a comment. The unique signature is provided as a digital signature, which can be facilitated using a private key assigned to the particular developer, and a public key. In some examples, the unique signature be a unique cryptographic hash based on the public/private key pair. In some examples, the signature unique to the author, and/or the comment. In some implementations, the comment is provided in comment MD, and is associated with the source code 210. As described in further detail herein, the comment MD can be stored in the comment MD repository 218 of the IDE 202, and the signed comment MD repository 232 of the comment MD platform 204.

In some implementations, the comment MD generator 212 generates comment MD based on interactions with one or more components of the IDE 202 (e.g., editor window(s), and source files of the source code 210. In some examples, the comment MD generator 212 registers projects (e.g., software development projects of respective applications) with the comment MD platform 204, delineates between comment (development) sessions, and interprets and records changes to already existing comments (e.g., who, what). In some examples, the comment MD generator 212 initiates comment signing (on behalf of the current user) for each comment (development) session.

In further detail, the comment MD generator 212 can access a list of editors provided by the IDE 202, and/or a list of file extensions representative of source code files. In some implementations, the comment MD generator 212 manages comment sessions that can occur concurrently with authoring (development) of the source code. In some examples, the comment MD generator 212 monitors (receives) input (e.g., keystrokes) provided to the source code. The comment MD generator 212 can recognize occurrence of comment authoring based on the input. For example, for source code written in Python, the input can include "# this is a comment," and can recognize that the input is a comment by the hash character (#). As another example, and for source code written in Python, the input can include edits to a comment, the comment MD generator 212 recognizing that a comment is being edited by the hash character preceding the text.

In some implementations, comments can be managed as single, or multiple entities depending on the characters indicating the comment. For purposes of illustration, several examples are provided below using the Java programming language as a non-limiting example. A first example comment can include:

// This is a single line comment.

The first example comment is managed as a single entity. A second example comment can include:

// This
    //is a
    //three line comment.

The second example comment can be managed as three entities. That is, comment MD can be provided for each of the three lines, each line being treated as a separate comment. A third example comment can include:

/* This is a single line block comment.*/

The third example comment can be managed as a single entity. A fourth example comment can include:

/* This
    is a
    three line block comment.*/

The fourth example comment can be managed as a single entity.

Accordingly, the comment MD generator 212 interprets input as comment insertions, and/or edits to comments. In response, the comment MD generator 212 provides MD (for each entity) associated with the input (e.g., signature of author, date, time). In some examples, the comment MD generator 212 automatically provides at least a portion of the input to the recommendation engine 216. In some examples, the user providing the input can request provision of the at least a portion of the input to the recommendation engine 216. As described in further detail herein, one or more recommendations for comment text can be provided based on the input provided to the recommendation engine 216.

In some implementations, the comment MD renderer 214 displays comments, and corresponding comment MD within the IDE 202. In some examples, the comment MD renderer 214 receives comment MD for a respective source code file (e.g., from the comment MD platform 204), interprets the comment MD, and displays relevant information. For example, for a particular comment within the source code 210, history of the comment and associated time(s)/date(s) and author(s) can be displayed (e.g., Comment Created: Apr. 1, 2019 at 12:03 PM, Author: John Q. Developer; Comment Edited Date: Jun. 8, 2019 at 8:37 PM, Author: Jane Q. Coder). In some examples, a history of changes to the comment can be displayed (e.g., strikethrough used to indicate deleted comment text, underling used to indicate added comment text).

In some implementations, the recommendation engine 216 provides recommendation for comments to be inserted into the source code 210. In some examples, the recommendation engine 216 provides recommendations for approaches, and/or comment text. In some examples, the recommendation engine 216 provides recommendations as input is received (e.g., either automatically from the comment MD generator 212, or from the user). In this manner, the recommendation engine 216 can provide comments in real-time (or near real-time). As used herein, real-time describes actions that can be automatically executed, without requiring human input and without any intentional delay, taking into account any processing limitations of the self-correction platform, and any time required to process data.

In some examples, the recommendation engine 216 operates in conjunction with the smart recommendation engine 222 of the comment MD platform 204. For example, the recommendation engine 216 can query the smart recommendation engine 222 based on the input provided, and the smart recommendation engine 222 can provide a response, which includes a recommendation that can be displayed to the user.

By way of one non-limiting example, the user can type a comment beginning with "/* Create HTTP co" as partial input to the source code 210. In response, the comment MD generator can automatically provide this as input to the recommendation engine 216, which provides one or more results. Example results can include "/* Create HTTP connection to x*/—the X library is used by 70% of developers in your organization," "/* Create HTTP connection to Y*/—the Y library is used by 20% of developers in your organization," and "/* Create HTTP connection to z*/—the Z library is used by 10% of developers in your organization." In some examples, the user can select a result, which can be inserted as the comment to the source code 210.

As another non-limiting example, the user can type "/* Create HTTP connection to z*/" as input to the source code 210. In response, the comment MD generator can automatically provide this as input to the recommendation engine 216, which provides one or more results. Example results can include "/* Create HTTP connection to X*/—the X library is used by 70% of developers in your organization," and "/* Create HTTP connection to y*/—the Y library is used by 10% of developers in your organization." In some examples, the user can ignore the results, or select a result, which can be inserted as the comment to the source code 210 in place of the user's original input.

In some implementations, the comment MD repository 218 is a datastore (e.g., a file) that records the signed comment MD for each development session. In some examples, the comment MD repository 218 can store comment MD per source code file, or per project (e.g., multiple source code files). In each case, the comment MD includes the unique signature of the author (user).

In some implementations, the comment MD platform 204 functions as a centralized (e.g., central to an enterprise, and multiple developers across the enterprise; global, being central to multiple enterprises, and multiple developers across the multiple enterprises). Accordingly, and as described in further detail herein, the comment MD platform 204 can leverage comment MD from across an enterprise, or enterprises to provided comment analysis, which facilitates learnings from the corpus of developers as a whole. For example development teams may not communicate with other teams in different reporting lines, yet these developers face similar problems, and may have solutions that will benefit others. The comment MD platform of the present disclosure provides the ability to introspect comments, identify common themes, and query other sources (e.g., crawl the web) for possible solutions. This enhances development productivity, and leads to enterprise-wide consistency (both within and across projects). This also supports an agile development environment by easing the reallocation of resources to different development teams.

In some implementations, the signature module 220 provides signatures for signing the comment MD, and validates signatures of signed comment MD. In some examples, when comment MD is to be signed within the IDE 202, the comment MD generator 212 can request a signature from the signature module 220. In some examples, the request includes at least a portion of the comment MD, and a unique identifier assigned to the user. The signature module 220 can use the user identifier to access user information (e.g., public key of the user) from the user repository 228, and/or the key repository 230. The signature module 222 can provide the signature in a response back to the comment MD generator 212. The comment MD generator 212 can store the signed comment MD to the (local) comment MD repository 218. The signature module 220 can store the comment MD to the (central) signed comment MD repository 232 of the comment MD platform 204.

In some examples, the signature module 220 checks signatures of signed comment MD. In this manner, the signature module 220 can confirm that the comment MD has not been tampered with. In some implementations, the signatures will be checked at synchronization of the (local) comment MD repository 218, and the (central) comment MD repository 232. In some examples, synchronization occurs when the user opens the IDE, and/or the sources for a particular project. In some examples, the signatures can be checked as code and comments are loaded by the IDE, and/or when there is any user interaction (e.g., viewing, editing). In some examples, during checking, the signature is recalculated to ensure the comment has not been tampered with.

In some implementations, comments and signatures are checked in batches on the comment MD platform 204 (e.g., periodically). In some examples, local comments that have not been synchronized, or whose local copies have not been checked since the last batch check can be identified (e.g., decorated within a UI).

In some implementations, and as introduced above, the smart recommendation engine 222 provides recommendations for comments to the IDE 202. For example, the smart recommendation engine 222 provides recommendations as results to the recommendation engine 216 of the IDE 202. In some examples, the recommendations are based on intra-enterprise knowledge (e.g., comments the developers of an enterprise use), inter-enterprise knowledge (e.g., comments developers of multiple enterprises use), and/or one or more external sources (e.g., crawling the web).

In some implementations, recommendations provided by the smart recommendation engine 222 are provided based on output of the semantic analysis engine 224. In some examples, the semantic analysis engine 224 processes comments to identify patterns, and the like. In some examples, the comments can be anonymized, such that any particular user, and/or enterprise are not identifiable from the comments (e.g., in an inter-enterprise scenario). Referring to the non-limiting example above, the semantic analysis engine 224 can process comments of an enterprise to identify a pattern "/Create HTTP connection to" that is provided in multiple source code files. The semantic analysis engine 224 can further process the comments to determine that the pattern is completed with "x*/" in 70% of the comments, "y*/" in 20% of the comments, and "z*/" in 10% of the comments. Consequently, this information can be used for recommendations, as described above.

In some examples, the semantic analysis engine 224 can recognize occurrences of instances where comments indicate that particular source code performs some function, and/or is a workaround for some limitation(s). As a non-limiting example, a comment within source code can read:
   // Following is a workaround for the fact that spatial data types are not supported//
The semantic analysis engine 224 can process the comment to determine that the source code following the comment is a workaround for the lack of support for spatial data types in the particular environment. In some examples, the semantic analysis engine 224 can copy at least a portion of the source code following the comment (e.g., a snippet of the source code), and tag the source code with one or more tags (e.g., solution, spatial data types). The source code can be indexed in a repository at least partially based on the one or more tags.

In some implementations, the smart recommendation engine 222 can query the repository based on one or more keywords. For example, the one or more keywords can be cross-reference to the index of the repository, and results responsive to the keywords can be provided. Continuing with the example above, the one or more keywords can include [solution] and [spatial data types], and a result can be provided, which includes the snippet of source code. In this manner, the snippet of source code can be presented to the user (e.g., through the recommendation engine 216 of the IDE 202), who can integrate the snippet of source code into their project (e.g., to solve the same issue of lack of support of spatial data types).

Implementations of the present disclosure further provide example workflows. An example workflow can include an administrative workflow for users, which can be used to register users with the comment MD platform 204 (e.g., establish username, password, role, permissions). In some examples, a user can be automatically registered with the comment MD platform 204 based on the user's registration with the IDE 202 (e.g., the same user information is used). In some examples, the user information is stored in the users repository 228.

Another example administrative workflow can include registering projects with the comment MD platform 204. In some examples, a project includes developing source code for an application, and project registration includes providing project-specific information (e.g., unique project identifier). In some examples, one or more users can be added to, or taken off a project. In some examples, the project information is stored in the projects repository.

Implementations of the present disclosure further provide development-related workflows. An example workflow can include validating signatures to comment MD, as described herein. Another example workflow can include conflict resolution such as, for example, resolving conflicts between an older version of source code, and a newer version of the source code (e.g., advising the user that there is a newer version of the source code available). Another example workflow can include a code development workflow, which can include, for example, creating a session, detecting comment authoring (e.g., insert, delete, update, copy, cut, paste to comments within source code), analyzing the source code file (e.g., at save, and/or at end of session), and analyzing keystrokes (e.g., to provide requests to the recommendation engine 216).

In some implementations, the comment MD platform 204 can enable communication with one or more authors. For example, a user can be editing source code, and may have a questions about a particular comment. As described herein, comment MD can be displayed to the user, which can include one or more authors of the comment. In some implementations, one or more available communication channels can be selectable from the comment MD that is displayed, the user being able to select a communication channels to communicate with an author. For example, if the author is still with the enterprise (e.g., still an employee), example communication channels can include instant messaging, email, telephone, VOIP call, and the like. The user can select a channel, and a communication with the author can automatically be instantiated. In this manner, users can be provided direct access to previous authors.

Figure 3:
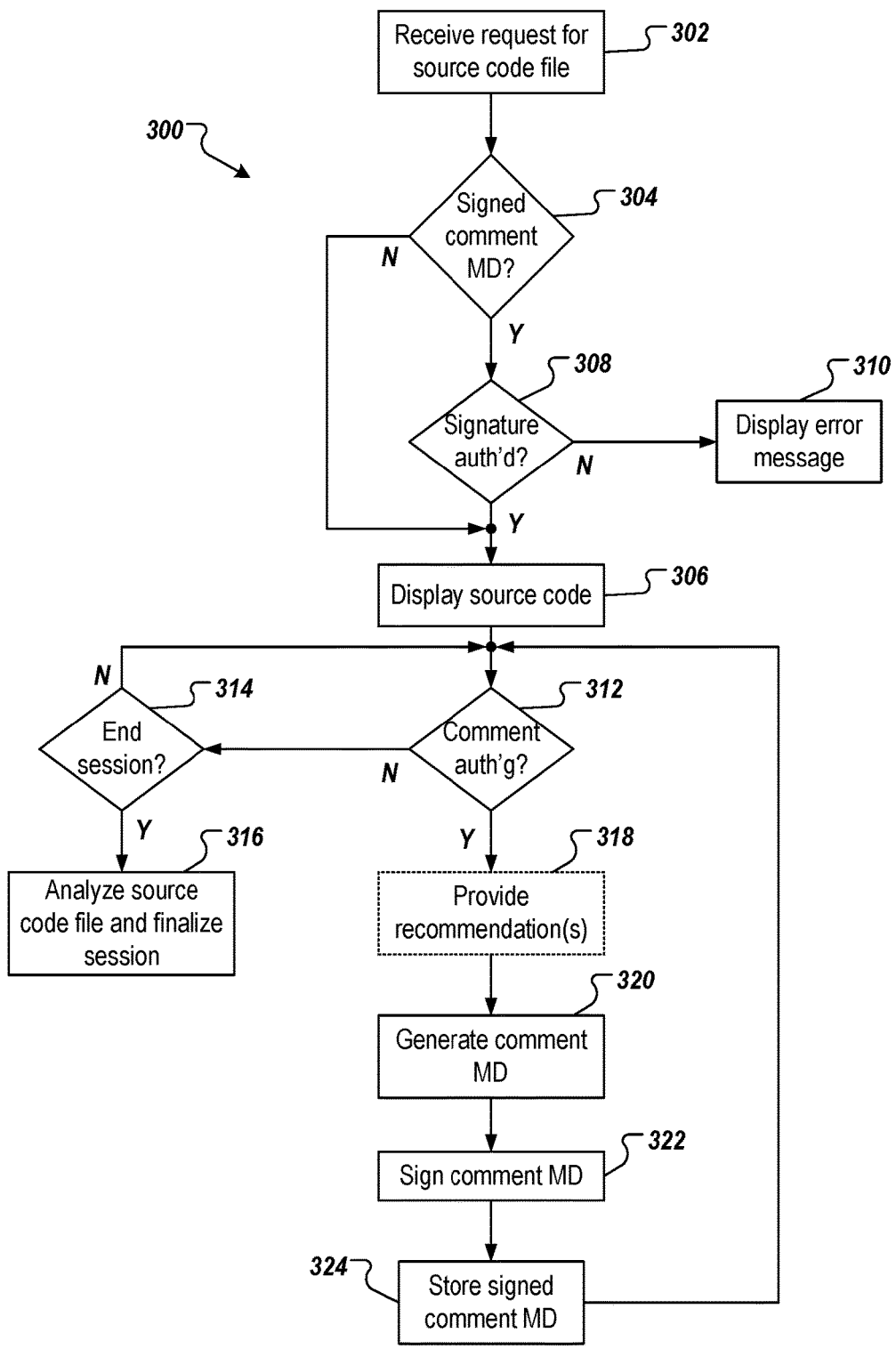
FIG. 3 depicts an example process that can be executed in accordance with implementations of the present disclosure.

FIG. 3 depicts an example process 300 that can be executed in accordance with implementations of the present disclosure. In some examples, the example process 300 can be provided by one or more computer-executable programs executed using one or more computing devices.

A request for a source code file is received (302). For example, a user can use the IDE 202 of FIG. 2 to instantiate a source code development session, and can request a source code file to access during the development session. It is determined whether the source code file includes source code having signed comment MD (304). In some examples, one or more repositories (e.g., the repository 218, and/or the repository 232) can be cross-reference with a unique identifier associated with the source code file (e.g., filename) to determine whether there is signed comment MD associated with the source code file. If there is no signed comment MD associated with the source code file, the source code is provided for display (306). For example, the IDE 202 displays the source code within the source code file to the user.

If there is signed comment MD associated with the source code file, it is determined whether one or more signatures are authenticated (308). In some examples, multiple instances of signed comment MD can be associated with the source code. For example, a first developer may have authored a first comment included in the source code, resulting in first signed comment MD, and a second developer may have authored a second comment included in the source code, resulting in second signed comment MD. In some examples, a signature is authenticated by the signature module 220 of the comment MD platform, as described herein. If one or more signatures is not authenticated, an error message is displayed (310). In some examples, the error message can indicate that at least one signature cannot be authenticated. This can indicate, for example, that the associated comment within the source code has been tampered with. In some examples, even though one or more signatures are not authenticated, the development session could continue. For example, with the knowledge that one or more particular comments may have been tampered with, a user could decide to move forward with their own development session. If the one or more signatures are authenticated, the source code is displayed (306).

It is determined whether comment authoring is occurring (312). For example, and as described herein, input to the source code can be monitored to determine whether an existing comment within the source code is being modified, or whether a new comment is being inserted. If comment authoring is not occurring, it can be determined whether the session is to end (314). For example, the user may have modified the source code without adding, or editing any comments, and has decided to complete the session. If the session is ended, the source code file can be analyzed, and the session finalized. If the session has not ended, the example process 300 loops back.

If comment authoring is occurring, as an optional function (indicated by the dashed line of FIG. 3), one or more recommendations can be provided. For example, and as described herein, input data can be provided to the recommendation engine 216, which can provide recommendations, as described herein. In some examples, the user can adopt a recommendation. In some examples, the user can ignore the recommendation(s). Comment MD is generated (320). For example, and as described herein, comment MD can be provided by the comment MD generator, and can be associated with the comment that the user edited, or added. The comment MD is signed (322). For example, and as described herein, a digital signature that is uniquely identifiable to the user (author) is provided for the comment MD. The signed comment MD is stored (324), and the example process 300 loops back.

Figure 4:
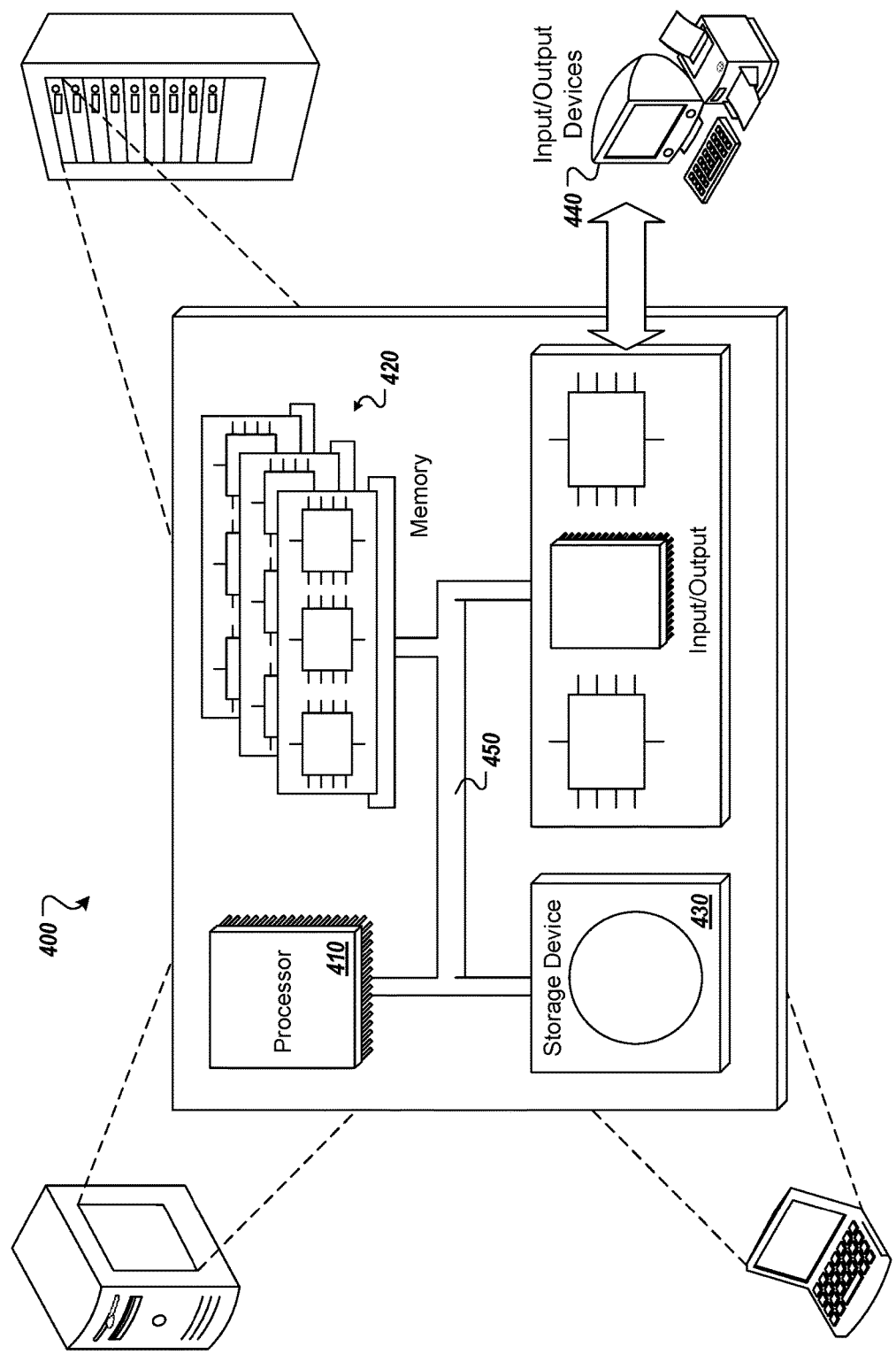
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both.

Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for managing comment metadata associated with comment text included in source code, the method being executed by one or more processors and comprising:
    receiving, by the one or more processors, a request to open a source code file for editing within an integrated development environment (IDE);
    determining, by the one or more processors, that the source code file comprises source code comprising first comment text having a first digital signature associated therewith, the first comment text comprising a comment to a portion of source code in the source code file;
    authenticating, by the one or more processors, the first digital signature, and in response, receiving first comment metadata and providing the first comment text for display with the first comment metadata in the IDE, the first comment metadata indicating one or more of time, date, and author of the first comment text;
    receiving, by the one or more processors, input data;
    determining, by the one or more processors, that the input data comprises authoring of comment text within the source code file, and in response, automatically:
        providing comment metadata that is associated with the comment text, and
        providing a second digital signature that is associated with the comment text; and
    storing, by the one or more processors, the comment text, the comment metadata, and the second digital signature in a comment metadata repository.

2. The method of claim 1, wherein the comment text of the input data comprises a modification of the first comment text, the first comment text having been authored by a first user, the modification having been authored by a second user, and the second digital signature is unique to the second user and the modification.

3. The method of claim 1, wherein the comment text of the input data comprises a second comment added to the source code by a user, and the second digital signature is unique to the user and the second comment.

4. The method of claim 1, further comprising providing one or more recommendations for the comment text based on the input data.

5. The method of claim 4, wherein a recommendation comprises optional comment text.

6. The method of claim 4, wherein a recommendation comprises a snippet of source code.

7. The method of claim 4, wherein the one or more recommendations are provided based on semantic analyses of a plurality of comments included across a plurality of source code files.

8. A non-transitory computer-readable storage medium coupled to one or more processors and having instructions stored thereon which, when executed by the one or more processors, cause the one or more processors to perform operations for managing comment metadata associated with comment text included in source code, the operations comprising:
    receiving a request to open a source code file for editing within an integrated development environment (IDE);
    determining that the source code file comprises source code comprising first comment text having a first digital signature associated therewith, the first comment text comprising a comment to a portion of source code in the source code file;
    authenticating the first digital signature, and in response, receiving first comment metadata and providing the first comment text for display with the first comment metadata in the IDE, the first comment metadata indicating one or more of time, date, and author of the first comment text;
    receiving input data;
    determining that the input data comprises authoring of comment text within the source code file, and in response, automatically:
        providing comment metadata that is associated with the comment text, and
        providing a second digital signature that is associated with the comment text; and
    storing the comment text, the comment metadata, and the second digital signature in a comment metadata repository.

9. The computer-readable storage medium of claim 8, wherein the comment text of the input data comprises a modification of the first comment text, the first comment text having been authored by a first user, the modification having been authored by a second user, and the second digital signature is unique to the second user and the modification.

10. The computer-readable storage medium of claim 8, wherein the comment text of the input data comprises a second comment added to the source code by a user, and the second digital signature is unique to the user and the second comment.

11. The computer-readable storage medium of claim 8, wherein operations further comprise providing one or more recommendations for the comment text based on the input data.

12. The computer-readable storage medium of claim 11, wherein a recommendation comprises optional comment text.

13. The computer-readable storage medium of claim 11, wherein a recommendation comprises a snippet of source code.

14. The computer-readable storage medium of claim 11, wherein the one or more recommendations are provided based on semantic analyses of a plurality of comments included across a plurality of source code files.

15. A system, comprising: a computing device; and
a non-transitory computer-readable storage device coupled to the computing device and having instructions stored thereon which, when executed by the computing device, cause the computing device to perform operations for managing comment metadata associated with comment text included in source code, the operations comprising:
receiving a request to open a source code file for editing within an integrated development environment (IDE);
determining that the source code file comprises source code comprising first comment text having a first digital signature associated therewith, the first comment text comprising a comment to a portion of source code in the source code file:
authenticating the first digital signature, and in response, receiving first comment metadata and providing the source code file the first comment text for display with the first comment metadata in the IDE, the first comment metadata indicating one or more of time, date, and author of the first comment text;
receiving input data;
determining that the input data comprises authoring of comment text within the source code file, and in response, automatically:
providing comment metadata that is associated with the comment text, and providing a second digital signature that is associated with the comment text; and
storing the comment text, the comment metadata, and the second digital signature in a comment metadata repository.

16. The system of claim 15, wherein the comment text of the input data comprises a modification of the first comment text, the first comment text having been authored by a first user, the modification having been authored by a second user, and the second digital signature is unique to the second user and the modification.

17. The system of claim 15, wherein the comment text of the input data comprises a second comment added to the source code by a user, and the second digital signature is unique to the user and the second comment.

18. The system of claim 15, wherein operations further comprise providing one or more recommendations for the comment text based on the input data.

19. The system of claim 18, wherein a recommendation comprises optional comment text.

20. The system of claim 18, wherein a recommendation comprises a snippet of source code.

* * * * *